(12) United States Patent  (10) Patent No.: US 7,114,752 B2
Voelker  (45) Date of Patent: Oct. 3, 2006

(54) SLIP COUPLING FOR PIPE (76) Inventor: Dean E. Voelker, P.O. Box 828, Black Diamond, WA (US) 98010-0828

( * ) Notice: Subject to any disclaimer, the term of this patent is extended or adjusted under 35 U.S.C. 154(b) by 21 days.

(21) Appl. No.: 10/688,422

(22) Filed: Oct. 16, 2003

(65) Prior Publication Data

US 2005/0082830 A1 Apr. 21, 2005

(51) Int. Cl.
F16L 15/02 (2006.01)
(52) U.S. Cl. .................... 285/302; 285/367; 285/415
(58) Field of Classification Search ............... 285/298, 285/302, 325, 367, 411, 415
See application file for complete search history.

(56) References Cited

U.S. PATENT DOCUMENTS 1,784,667 A * 12/1930 Gillet ......................... 285/415
2,562,946 A    8/1951 Read
2,780,482 A *  2/1957 Brown ......................... 285/41
2,911,239 A * 11/1959 Marzolf, Sr. ................ 285/415
3,304,105 A *  2/1967 Hill ............................. 285/302
3,631,895 A    1/1972 Medina et al.
3,807,777 A *  4/1974 Larkin ......................... 285/302
4,334,578 A    6/1982 Labrum
4,749,215 A *  6/1988 Martin ......................... 285/187
5,746,453 A *  5/1998 Roberts ......................... 285/47
6,044,904 A    4/2000 Shafer
6,131,960 A * 10/2000 McHughs ..................... 285/302

* cited by examiner

Primary Examiner—David Bochna
(74) Attorney, Agent, or Firm—R. Reams Goodloe, Jr.

(57) ABSTRACT

A slip coupling. A tube having smooth outer walls is joined to a larger hollow outer casing using a slip coupling assembly. The casing has an interior cavity and a flanged end. An annular seal is placed adjacent the flanged end. A split flange is positioned adjacent the annular seal to compress the seal toward the flanged end. The split flange further includes a gasket seat for a gasket circumferentially extending around the smooth outer wall of the pipe, to form a fluid tight seal between the split ring and the outer wall of the pipe. One or more backing rings and a plurality of fasteners are utilized to secure (1) the flanged end of the outer casing, (2) the annular seal, (3) the split flange, and (4) the gasket, in a fluid tight relationship. The design is suitable for manufacture of parts in high density polyethylene.

63 Claims, 9 Drawing Sheets

SLIP COUPLING FOR PIPE

COPYRIGHT RIGHTS IN THE DRAWING

A portion of the disclosure of this patent document contains material that is subject to copyright protection. The applicant has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to couplings for pipe, and especially as may be employed in applications where pipe connections are required to accommodate longitudinal movement along the axis of the pipe, such as elongation or contraction. Such apparatus is particularly well suited to gas gathering operations in sanitary landfill applications.

BACKGROUND

When pipes are employed in situations where movement may be experienced between components of a piping system, the piping system needs to be designed to accommodate such movement, in order to avoid excess stress, strain, or bending moment, which may result in premature failure of the piping system. In one application, namely the collection of gas from sanitary landfills, the normally used plastic pipe products, such as high density polyethylene (HDPE), is subject to stress and strain from subsidence of the landfill mass below the surface of the landfill. Settlement, as well as temperature fluctuations, make design of piping systems for such applications problematic. The challenge of providing a safe, fluid tight, and sanitary environment for collection of gas from a landfill, has continued to require development of new apparatus and methods, especially to take advantage of bio-gas and route the same to an apparatus which can productively utilized such gas for the generation of heat and/or electrical or mechanical power. Currently, there is a great but as yet unmet need for systems that can easily accommodate telescoping of a pipe joint as the unstable landfill moves and settles, whether along a pipeline run or below a wellhead. Additionally, slip joints suitable for such a job could also find application for other utility applications, such as water or sewer pipe, or electrical conduit, where actual elongation or contraction is expected in normal operation and must be accommodated, or in applications where the potential for such movement must be included in the equipment installed, for example in connections between buildings and earthquake resistant/tolerant foundations. Consequently, this disclosure provides description of a novel slip coupling apparatus for pipe joints, and describes novel methods of employing such slip joints, such as in gas gathering piping in sanitary landfill applications.

BRIEF DESCRIPTION OF THE DRAWING

In order to enable the reader to attain a more complete appreciation of the invention, and of the novel features and the advantages thereof, attention is directed to the following detailed description when considered in connection with the accompanying figures of the drawing, wherein:

FIGS. 10, 11, 12, and 13 provide further details of one embodiment of a suitable slip ring, showing the configuration provided in perspective view in FIG. 2. First, in FIGS. 10 and 11, the slip ring is shown with the first portion and the second portion joined in a closed, working position, and dimensions are provided as typical of one suitable configuration, and such dimensions should be considered illustrative and not limiting to the precise sizes depicted. Then, in FIGS. 12 and 13, the slip ring is shown with the first portion and the second portion separated in an open position.

FIGS. 15, 16, 17, and 18 provide further details of another embodiment of a suitable slip ring, showing the configuration provided in perspective view in FIG. 5, where both the first ring portion and the second ring portion are identical. First, in FIGS. 15 and 16, the slip ring is shown with the first portion and the second portion joined in a closed, working position, and dimensions are provided as typical of one suitable configuration, and such dimensions should be considered illustrative and not limiting to the precise sizes depicted. Then, in FIGS. 17 and 18, the slip ring is shown with the first portion and the second portion separated in an open position.

The foregoing figures, being merely exemplary, contain various elements that may be present or omitted from actual implementations and various configurations of a slip coupling which may be used for a variety of pipe joint situations, depending upon the circumstances. An attempt has been made to draw the figures in a way that illustrates at least those elements that are significant for an understanding of the various embodiments and aspects of the invention. However, various other elements of the unique slip coupling are also shown and briefly described to enable the reader to understand how various features, including optional or alternate features, may be utilized in order to provide a simple slip coupling for piping systems.

DETAILED DESCRIPTION

In many piping applications, it would be advantageous to provide a joint, and especially a fluid tight joint, that would enable a first pipe and a second pipe, such as may occur in gas gathering pipe, to move relative one to the other. Such a joint is provided in the slip-coupling 20 illustrated in FIG. 1, where a pipe 22 having a longitudinal axis 24 and a smooth outer wall 26 is joined to an outer casing 40. As configured, the pipe 22 is substantially cylindrical with a pipe interior passageway 30 defined by interior wall 32 and a pipe upper end 34. The pipe upper end 34 is free to move within a casing interior passageway 36, defined by interior casing wall 38 of outer casing 40, along longitudinal axis 24 by a preseleted distance L. Thus, the casing interior passageway 36 is sized and shaped to fit therein at least some length of the pipe 22, so as to allow for expansion or contraction. For example, in typical landfill applications, the pipe upper end 34 may move downward in the direction of reference arrow 42, via subsidence in the landfill, relative to a selected reference plan R. Alternately, as shown in FIG. 4, the pipe upper end 34 may move in a contraction fashion to a new location 34', rather than in the elongation fashion as just depicted in FIG. 1.

Figure 2:
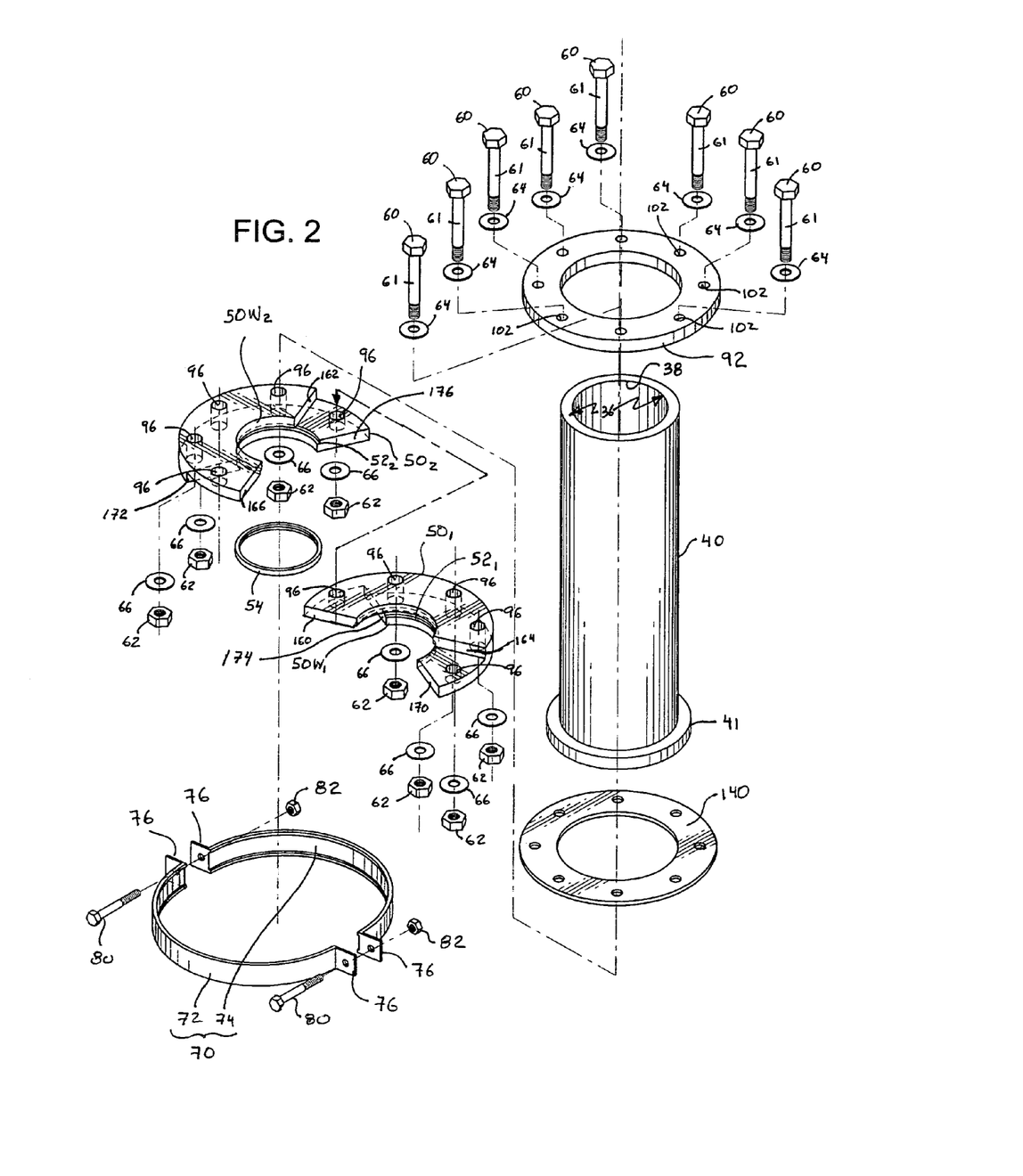
FIG. 2 provides an exploded perspective view of one embodiment for a slip coupling, showing the outer casing with flanged end, a outer casing backing flange, an annular seal, one embodiment of a split ring, a gasket which is secured about a pipe by the split ring, and a compression ring used to secure the split ring about a pipe, as well as a plurality of fasteners.
Figures 3, 4:
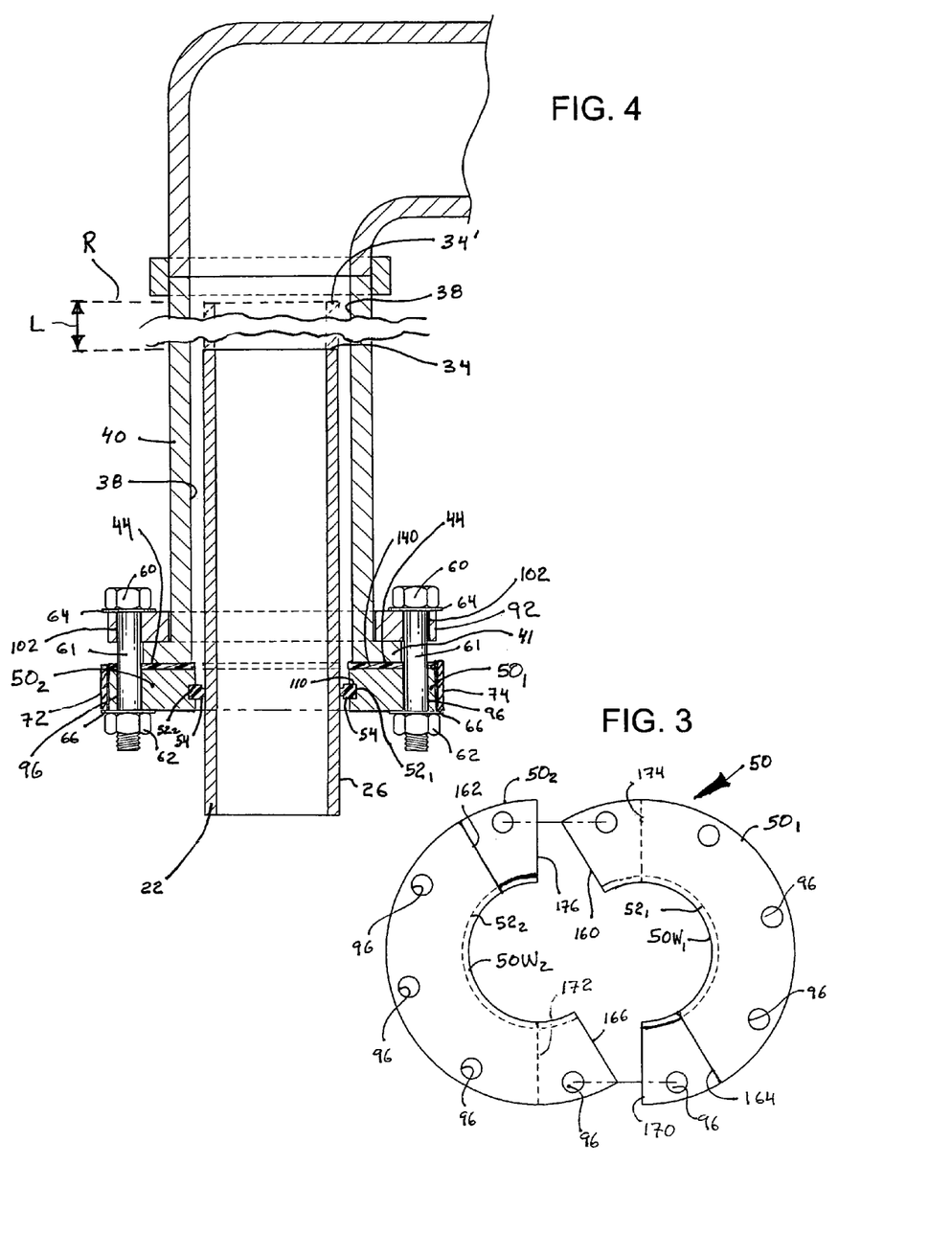
FIG. 3 provides a top view, looking down at the embodiment of a suitable split ring that was first illustrated in FIG. 2.
FIG. 4 provides a vertical cross-sectional view of one embodiment for a slip coupling as taught herein, showing an outer casing with flanged end, an outlet casing backing flange, an annular seal, a split ring with gasket secured in an annular groove, so that the smooth wall of a pipe may slide relative to the gasket by a distance L, as well as a plurality of suitable fasteners.
Figure 5:
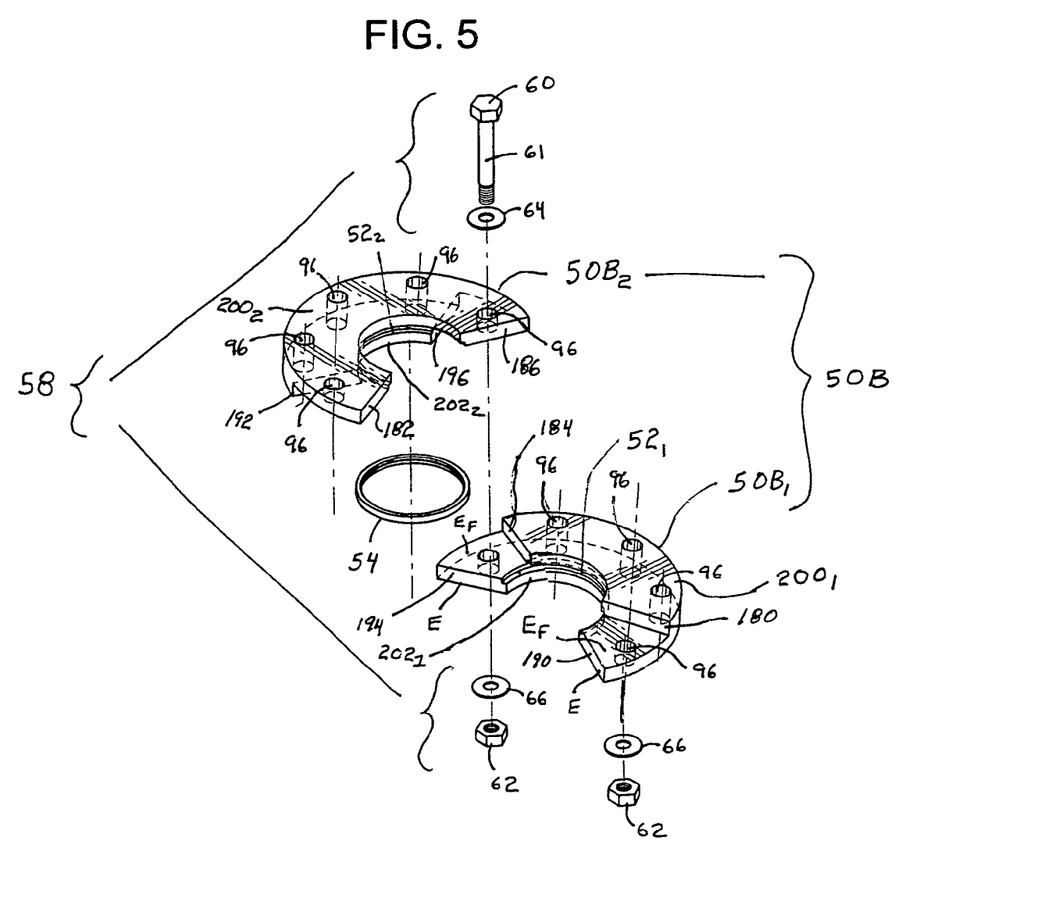
FIG. 5 provides a perspective view of another embodiment of a suitable split ring, which embodiment may be used in lieu of that first shown in FIGS. 2 and 3; in this embodiment, the first split ring portion and the second split ring portion are identical, and may be easily matched for installation to secure a gasket.

Further details of a first embodiment for a slip coupling 20 are depicted in FIG. 4. Here, the flange end 44 of outer casing 40 is shown. A split ring 50, also shown in FIG. 3, is provided. The split ring 50 has first 50, and second 50$_2$ ring portions. The first 50$_1$ and second 50$_2$ ring portions each have an interior wall, 50W$_1$, and 50W$_2$, respectively. The interior walls 50W$_1$ and 50W$_2$ each include at least one gasket seat 52$_1$ and 52$_2$, respectively. A gasket 54 is provided, in one embodiment in the form of a continuous ring gasket 54 as shown in FIGS. 2 and 5, which is located by the gasket seat 52 formed by in inner walls 50W$_1$, and 50W$_2$ by gasket seat portions 52$_1$ and 52$_2$, respectively. Gasket 54 is adapted to slidably receive the smooth outer wall 26 of the pipe 22 and to provide a fluid tight seal between the split ring 50 and the smooth outer wall 26 of the pipe 22.

The gasket 54 can be made of a resilient material having a coefficient of friction sufficiently low that the gasket 54 remains seated during sliding movement of the gasket 54 over said smooth outer wall 26 of the pipe 22. Of course, such necessary characteristics may vary depending upon the size and shape of the gasket seat, the size and shape of the gasket, and the material of construction of pipe 22. Slip couplings as taught herein are especially suited for applications where piping utilized is made of high density polyethylene (HDPE), but many other types of pipe, including stainless steel, aluminum, or other thermoplastic materials could be utilized for pipe 22. In any event, one suitable gasket 54 material useful for HDPE applications is a gasket 54 made of VITON® brand fluorolastomer (hexafluoropropylene-vinylidene) marketed by Dupont Dow Elastomers LLC of Wilmington, Del., USA. Functional equivalents from other vendors may be utilized for this or other specific applications, depending of course on the nature of the surface which moves relative to the gasket material. One commonly available functional equivalent is a FLUOREL® brand fluorolastomer marketed by 3M (Minnesota Mining and Manufacturing Company of St. Paul, Minn., USA, or the current owner of the FLUOREL® brand, Dyneon LLC of Oakdale, Minn. USA.

As shown in FIGS. 2 and 3, the first 50, and second 502 ring portions may be provided in an open position as seen in these two figures, wherein first 50$_1$ and second 50$_2$ ring portions open to allow their attachment to or removal from the pipe 22. By removal of selected fasteners 58 such as bolts 60 (having shafts 61) and companion nuts 62, (accompanied by upper 64 and lower 66 washers as may be easily determined by those of ordinary skill in the art), split ring 50 can be positioned in an open position, ready for attachment to or removal from pipe 22. Then by repositioning the fist 50$_1$ and second 50$_2$ split ring portions, and then tightening fasteners 58, the split ring can be secured in a closed position wherein said first 50$_1$ and second 50$_2$ split ring portions are secured in close fitting engagement around pipe 22, and in particular, positioned so as to bring gasket 54 in to sealing circumferential engagement with the smooth outer surface 26 of pipe 22.

Figure 1:
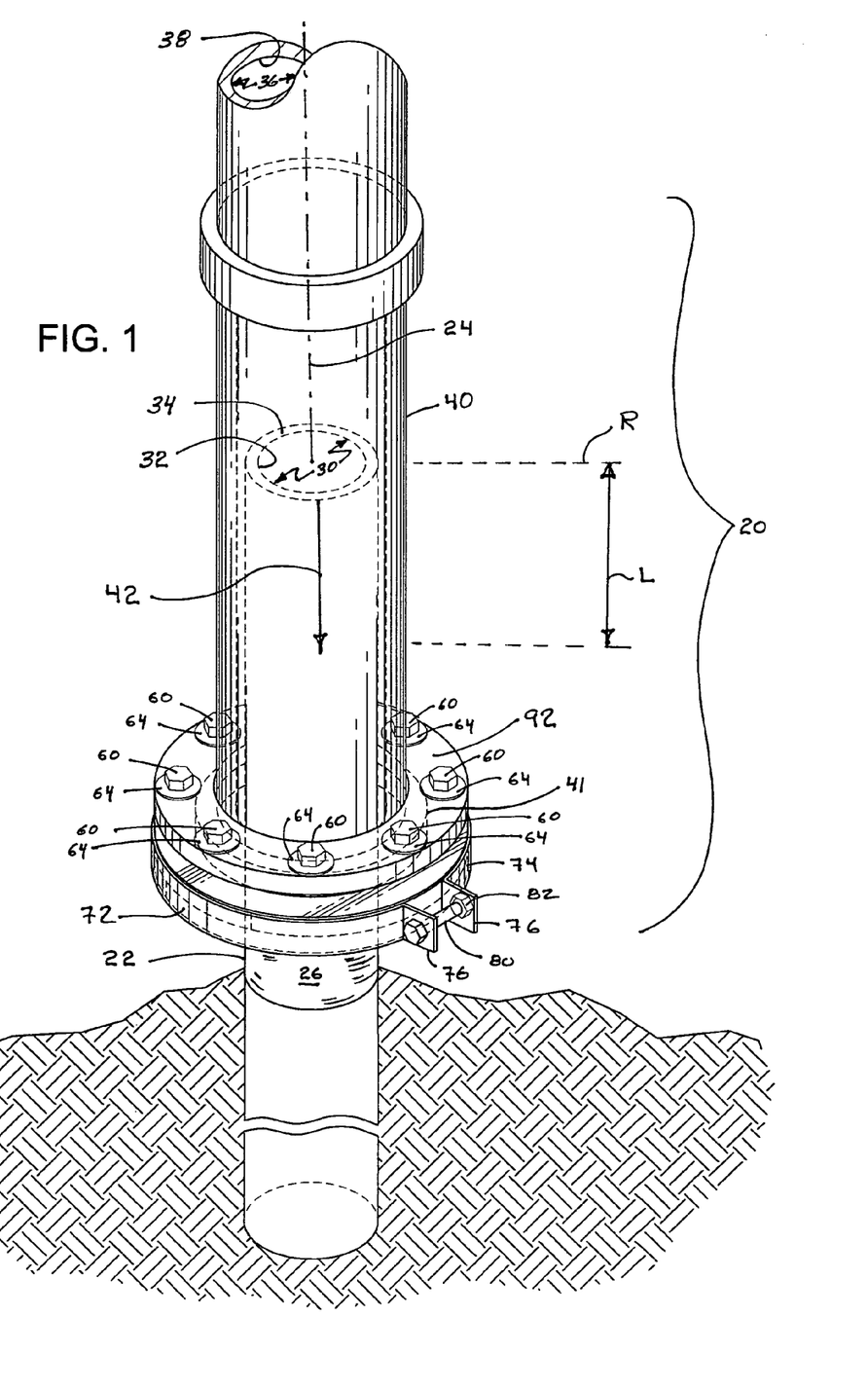
FIG. 1 provides a front perspective view of one embodiment of a slip coupling apparatus taught herein, showing a first, smooth wall well pipe exiting the ground such as in a landfill, then a larger, outer casing which is provided and secured thereabove, as well as an outer casing backing flange that is used to secure a flanged end (not visible, see FIG. 2) of the outer casing to a split ring, and a compression retainer which is utilized to secure the split ring circumferentially about the well pipe.

As seen in FIGS. 1, 2, and 4, a compression retainer 60 can be provided, where the compression retainer 70 circumferentially confines the split ring 50 against radially outward movement. In one embodiment, the compression retainer 70 is provided in the form of an adjustably tightenable substantially circular metallic band. As further detailed in FIG. 2, in one embodiment, a suitable compression retainer 70 may be provided in the form of a pair of substantially semi-circular metallic band portions 72 and 74, which semi-circular metallic band portions have opposing attachment ear portions 76. The opposing attachment ear portions securable each toward the other by adjustably tightenable fasteners 78, which may be provided in the form of bolt 80 and nut 82.

Figure 14:
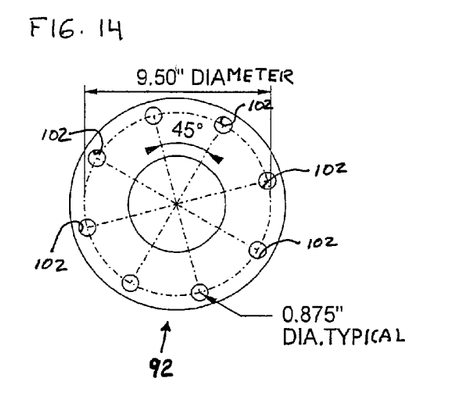
FIG. 14 provides a top plan view of a outer casing backing flange, showing the fastener hole pattern that may be typically supplied to match the fastener hole pattern in a slip ring.
Figure 15:
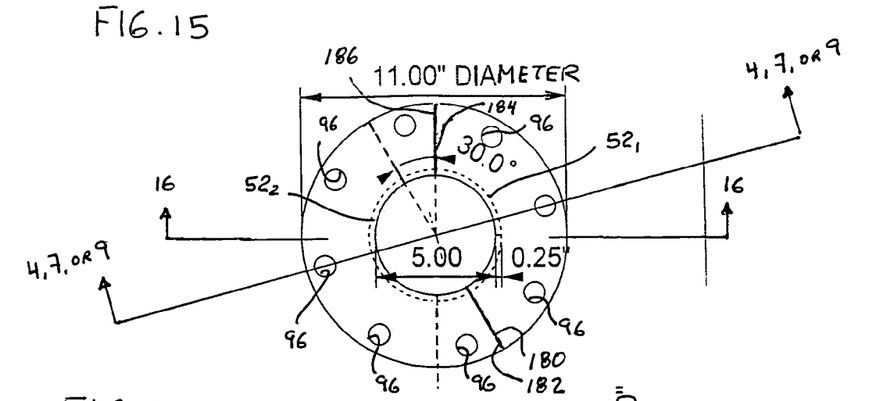
FIG. 15 provides a top, plan view of the slip ring.
Figure 16:
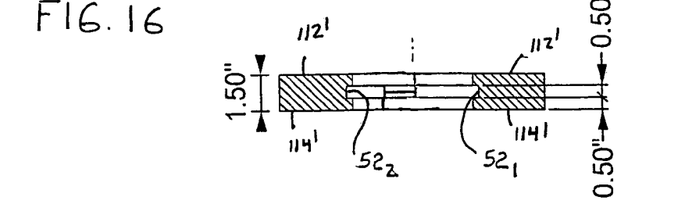
FIG. 16 provides a vertical cross-section view, taken across line 16—16 of FIG. 15.
Figure 17:
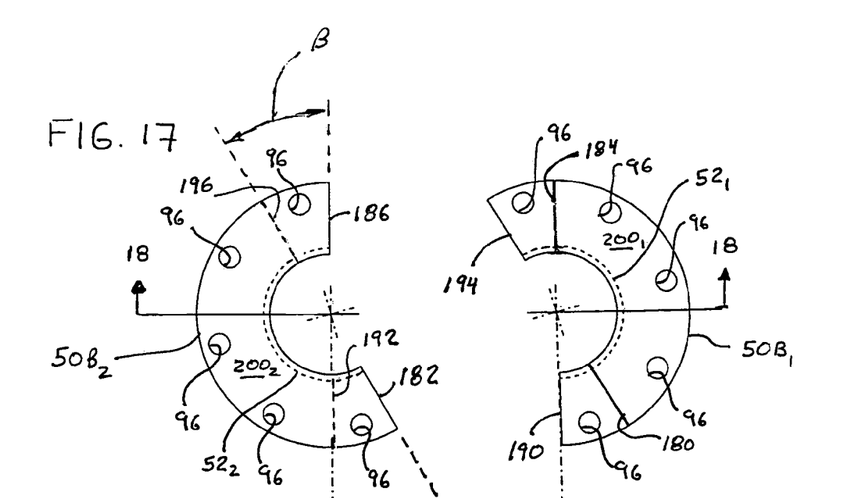
FIG. 17 provides a top, plan view of the slip ring, now in a separated, open position.
Figure 18:
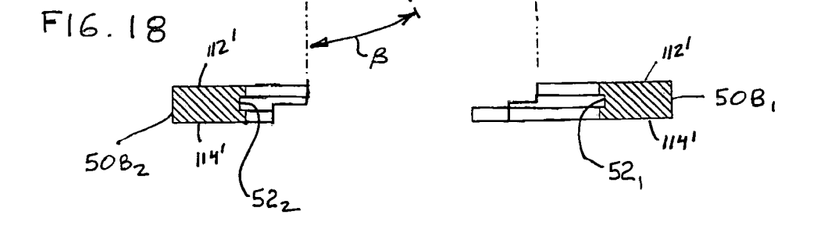
FIG. 18 provides a vertical cross-section view of a slip ring, now in a separated, open position, taken across line 18—18 of FIG. 17.

In one embodiment, as seen in FIGS. 1, 2, and 4 the outer casing 40 is provided with a flanged end 41, and an outer casing backing flange 92 is provided, sized and shaped for close fitting engagement over the flanged end 41 of the outer casing 40. In the embodiment illustrated in FIG. 14, the outer casing backing flange 41 has eight apertures 100 for bolt holes, each defined by an aperture edge wall portion 102. The eight apertures 100 are, in the embodiment shown in FIG. 14, spaced equally angularly apart, or, in other words, forty five degrees (45°) angularly apart.

Generally, the first $50_1$ and second $50_2$ ring portions, when in a closed position, form a split ring 50 having a substantially annular ring shape which extends between an outer wall 94 (having outer wall portions $94_1$ and $94_2$), and the interior wall 50W, made up of inner wall portions $50W_1$ and $50W_2$. The split ring 50 also normally includes a plurality of longitudinally extending bolt through apertures defined by bolt hole interior walls 96.

Also, the outer casing backing flange 92 includes a plurality of fastener through apertures 100, wherein each fastener through aperture is defined by an aperture edge wall portion 102. The shaft portions 61 of fasteners 58 are sized and shaped for fitting through one of the fastener through apertures 100 in the outer casing backing flange 92 and through a companion axially aligned bolt through aperture 96 in the split ring 50. At least one, and in most embodiments, a plurality, and in the embodiments shown, eight through apertures 100 are utilized, and thus eight fasteners 58 are utilized. The fasteners 58 are adjustably tightenable to secure the outer casing backing flange 92 and the split ring 50 each toward the other.

Turning now to FIGS. 2, 4, 11 and 13, the gasket seat 52 can be provided, in one embodiment, in the form of a recess or annular groove 110 in the interior sidewall 50W of said first $50_1$ and second $50_2$ ring portions. In the embodiment shown in FIG. 11, the annular groove 110 is spaced in a centered relationship between the obverse side 112 and the reverse side 114 of the split ring 50. More particularly, in the embodiment depicted in FIG. 11, the annular groove 110 has a height $H_A$ extending between a lower groove side 116 and an upper groove side 118. In one embodiment, a groove 110 height $H_A$ of about one half inch (0.5") in height and of about one quarter inch (0.25") in depth has been found adequate, in an application where the overall split ring has a total height of about one and one-half inches (1.5"). In some designs, the first $50_1$ and second $50_2$ ring portions have an upper interior body portion $120_1$ and $120_2$, respectively, above the upper groove side 118, and a lower interior body portion $1221$ and $1222$, respectively, below the lower groove side 116. As shown in the embodiment depicted in FIG. 11, the upper interior body portions $120_1$ and $120_2$ extend between the obverse side 112 of the first $50_1$ or second $50_2$ split ring portion and said upper groove side 118 of the annular groove 110, and the upper interior body portion $120_1$ or $120_2$ has a thickness $H_I$ equal to height $H_A$ of the annular groove. Likewise, with equidistant spacing, the lower interior body portion $122_1$ or $122_2$ extends between the reverse side 114 of the first $50_1$ or the second $50_2$ split ring portion and the lower groove side 116 of the annular groove 110, and wherein the lower interior body portion $122_1$ or $122_2$ has a thickness $H_L$ equal to height $H_A$ of the annular groove 110.

Figure 6:
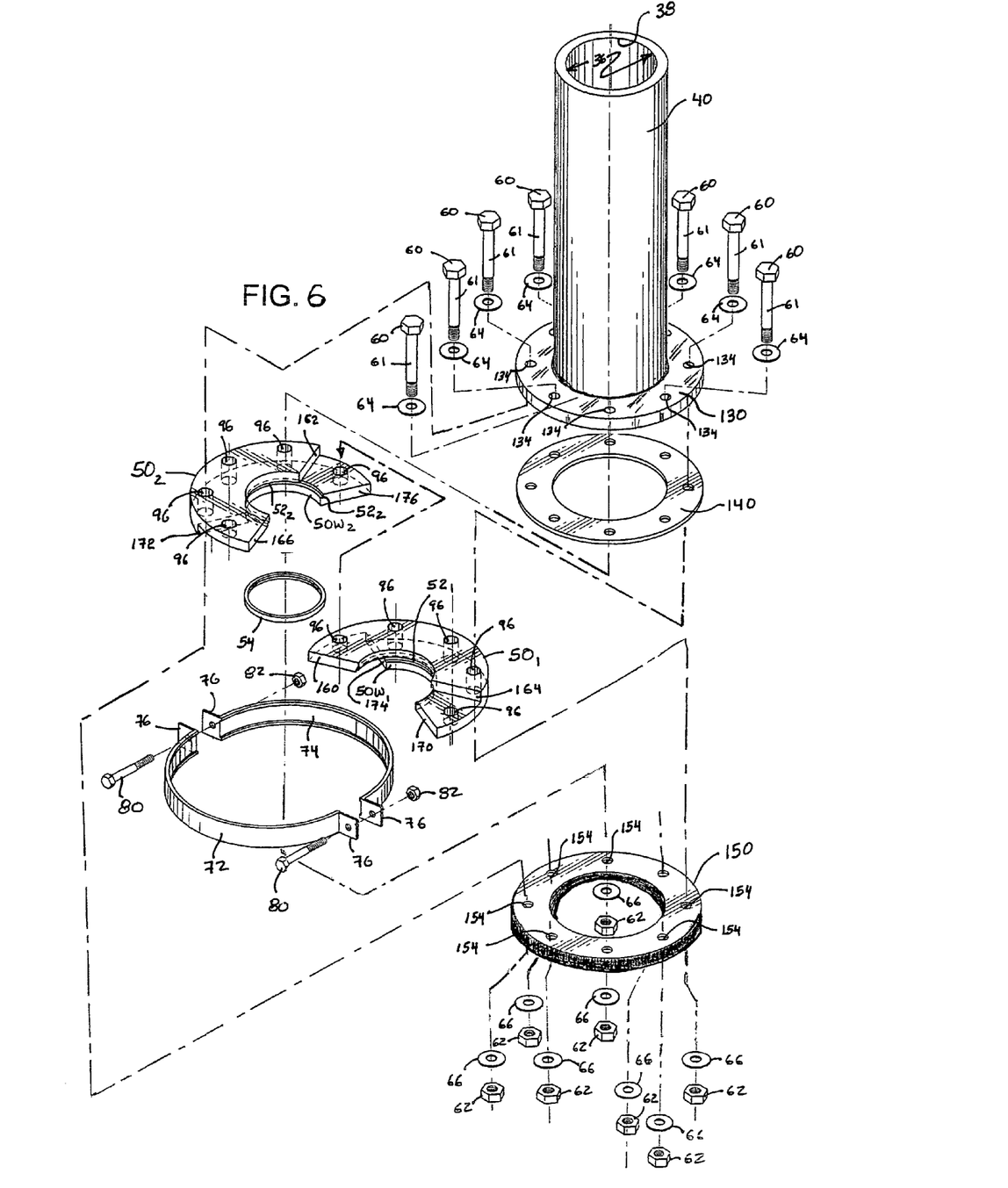
FIG. 6 shows a perspective view of another embodiment of a slip coupling, here utilizing an integral outer casing flange, an annular seal for sealing engagement between the integral outer casing flange and an obverse surface of one embodiment of a split ring, and also using a backing flange for the split ring.

Returning now to FIGS. 6 and 7, in one embodiment, the outer casing 40 is provided with an integral outer casing flange 130 of width $W_{130}$ sufficient to provide, along a longitudinal axis, a plurality of fastener holes 132 defined by flange interior hole edge walls 134. In any event, flange 41 as shown in FIG. 2, or flange 130 as shown in FIG. 6, has a flange face portion 41F or 130F, respectively against which a resilient annular seal 140 is compressed. The annular seal 140 is sized and shaped for sealing engagement with and compression between the selected flanged face portion (41F or 130F) and the obverse side 112 of the split ring 50.

Figures 7, 8:
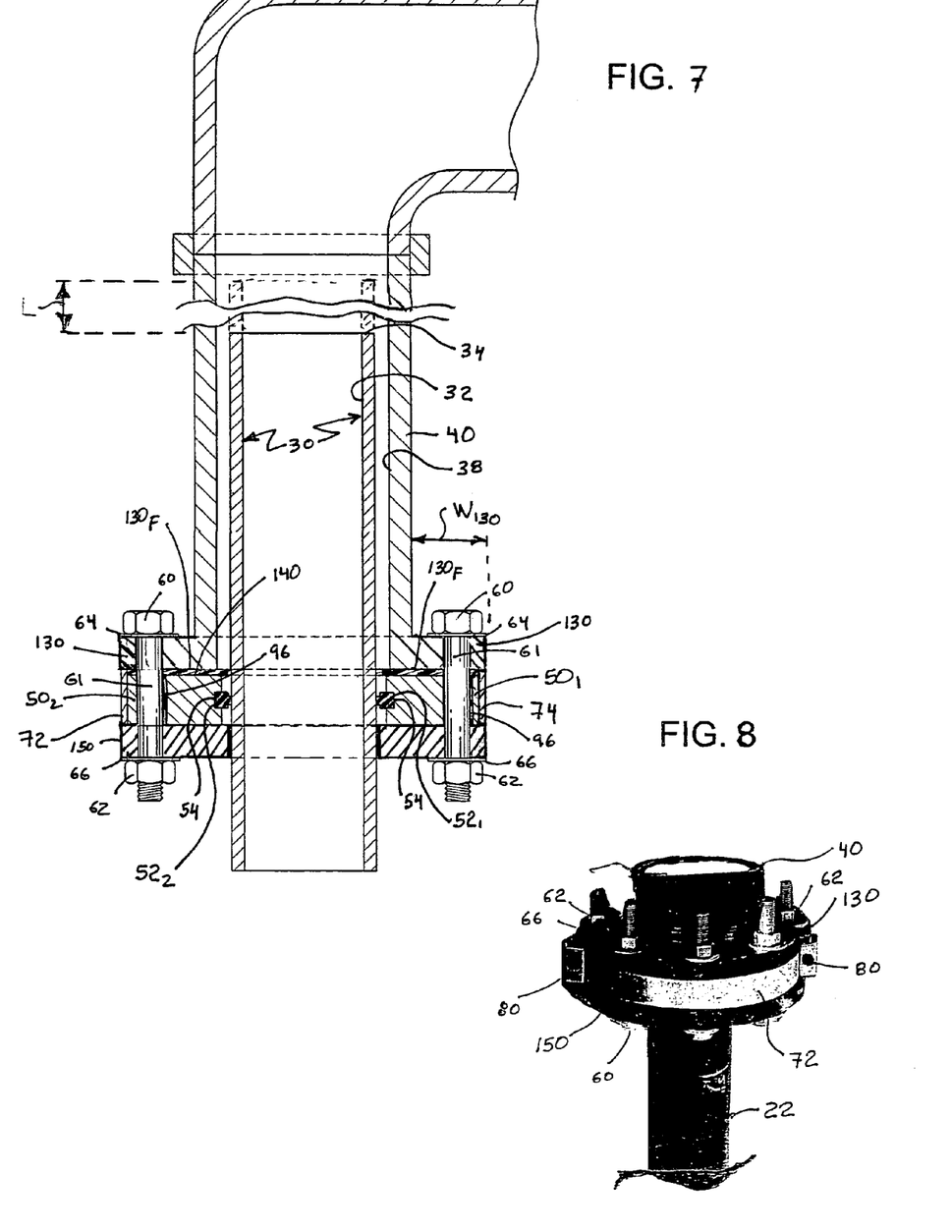
FIG. 7 illustrates the embodiment first shown in FIG. 6, and shows the use of the integral outer casing flange, an annular seal, a slip ring with centered annular groove to accommodate a gasket which is sealed against a pipe, a seal ring backing flange, and a plurality of fasteners to secure the components together to provide a pressurizible, leak tight joint.
FIG. 8 provides a perspective view similar to the embodiment just illustrated in FIGS. 6 and 7, but now showing the same components where the bolts used for fasteners are inverted as compared to the illustration provided in FIG. 7.
Figure 9:
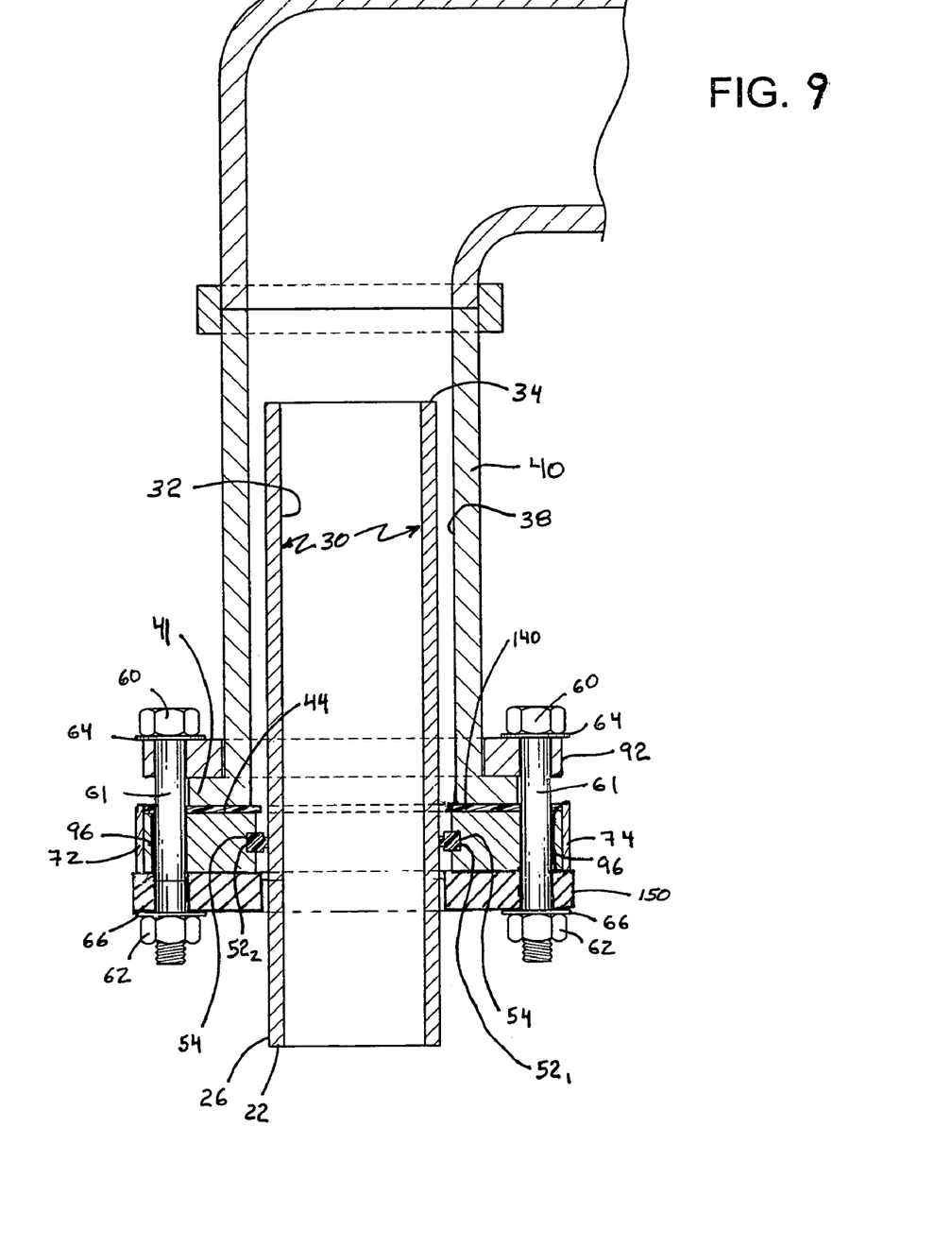
FIG. 9 provides a still further embodiment of my slip coupling, here showing the use of an outer casing backing flange, a flanged end on the outer casing, an annular seal, a split ring with gasket, and a backing flange for the split ring, with fasteners to secure the slip coupling in a leak tight configuration, as well as the use of the circumferential compression retainer around the slip ring.

For additional stability, a split ring backing flange 150 can be provided. As seen in FIGS. 6 and 7, the split ring backing flange 150 is sized and shaped for close fitting, secured engagement against the split ring 50, where the positioning can be secured via fasteners 58. In such event, the split ring backing flange 150 has a plurality of fastener through apertures 152, each of which are defined by an aperture edge wall portion 154. The shaft portions 61 of the fasteners are sized and shaped for fitting through one of the fastener through apertures 152 in the split ring backing flange 150, and through a companion axially aligned bolt 60 through aperture defined by edge wall 96 in the split ring 50. As noted above, at least one, and in most embodiments, a plurality, and in the embodiments shown, eight through apertures 152 are utilized, and thus eight fasteners 58 are utilized. The fasteners 58 are adjustably tightenable to secure the split ring backing flange 150 and the split ring 50 each toward the other.

For many applications an outer casing 40 can be provided in high density polyethylene, which, for example is commonly utilized in landfill gas gathering applications. Likewise, in such applications, the split ring 50 can be made from high density polyethylene. And similarly, in such cases it is often useful to provide the split ring backing flange 150 in high density polyethylene. However, those of ordinary skill in the art and to which this specification is directed will recognize that alternate materials are sometimes necessary or desirable. For example, an outer casing backing flange 92 can be provided in ductile iron, or in an another suitable material for a specific service requirement or cost objective.

As seen in FIGS. 2, 6, and 10–13, the split ring 50 can, in one embodiment, be provided with obverse side 112 and reverse side 114 which are identical. Alternately, as seen in FIGS. 5, and 15–18, in another embodiment SOB for a split ring, the obverse side 112' and the reverse side 114' are not identical, but, rather, the obverse side 112' matches, identically, the reverse side 114' of a companion flange suitable for mating engagement. In either case, whether with split ring 50 or with split ring SOB, each one of the split ring portions $50_1$ and $50_2$, or $50B_1$ and $50B_2$, has a pair of ear portions E. Each ear portion E has a face portion $E_F$ adapted for matching engagement with a matching face portion $E_F$ of another split ring portion. In various embodiments, ear portions extend arcuately so that the ear portions of a first ring portion and the ear portions of a second ring portion are configured for close fitting mating engagement when the split ring portions are in the closed position.

Figure 10:
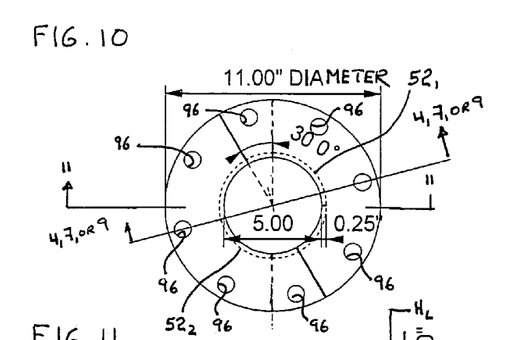
FIG. 10 provides a top, plan view of the slip ring.
Figure 11:
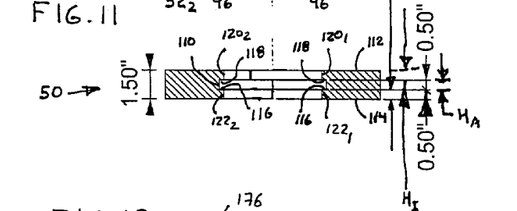
FIG. 11 provides a vertical cross-section view, taken across line 11—11 of FIG. 10.
Figure 12:
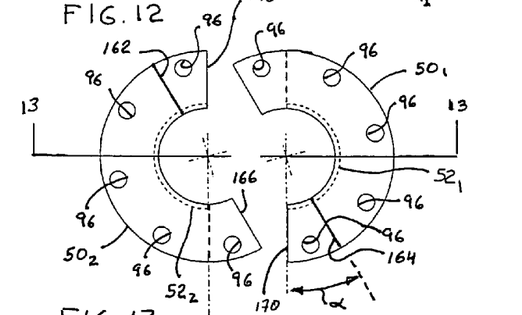
FIG. 12 provides a top, plan view of the slip ring, now in a separated, open position.
Figure 13:
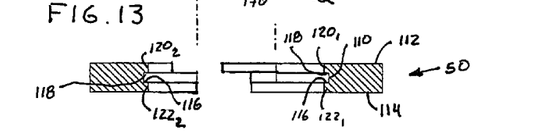
FIG. 13 provides a vertical cross-section view of a slip ring, now in a separated, open position, taken across line 13—13 of FIG. 12.

As can be seen in FIGS. 2 and 10, in one embodiment, an outer upper end wall 160 of first split ring portion $50_1$ fits in close fitting matching engagement with inner upper end wall 162 of second split ring portion $50_2$. And, inner upper end wall 164 of first split ring portion $50_1$ fits in close fitting matching engagement with outer upper end wall 166 of second split ring portion $50_2$. In the same embodiment, an outer lower end wall 170 of first split ring portion $50_1$ fits in close fitting matching engagement with inner lower end wall 172 of second split ring portion $50_2$. And, inner lower end wall 174 of first split ring portion 50₁ fits in close fitting matching engagement with outer lower end wall 176 of second split ring portion 50₂.

Similarly, in an alternate embodiment as seen in FIGS. 5, and 15–18, a first upper end wall 180 of first split ring portion 50B₁ fits in close fitting matching engagement with first outer upper end wall 182 of second split ring portion 50B₂. And, second upper end wall 184 of first split ring portion 50B₁ fits in close fitting matching engagement with second outer upper end wall 186 of second split ring portion 50B₂. In the same embodiment, a first outer lower end wall 190 of first split ring portion 50B₁ fits in close fitting matching engagement with first inner lower end wall 192 of second split ring portion 50B₂. And, second lower end wall 194 of first split ring portion 50B₁ fits in close fitting matching engagement with second inner lower end wall 196 of second split ring portion 50B₂.

As shown in FIGS. 5 and 15–18, split ring portions 50B₁ and 50B₂ can be provided where each has a first arc portion 200₁ and 200₂, respectively, on the obverse side 112' having a first thickness $H_I$ on one side of the gasket seat 52₁ or 52₂, respectively, and a second arc portion 202₁ and 202₂ on the reverse side 114' having a second thickness of $H_L$ on a longitudinally opposite side of the gasket seat 52₁ or 52₂, respectively. As shown, first arc portion 200₁ is less than one hundred eighty degrees (180°) degrees, and said second arc portion 202₁ is more than one hundred eighty degrees (180°). And, in matching angular fashion, first arc portion 200₂ is less than one hundred eighty degrees (180°) degrees, and said second arc portion 202₂ is more than one hundred eighty degrees (180°). In one suitable embodiment, the first arc portion 200₁ of the first split ring portion 50B₁ is one hundred fifty degrees (150°), and the second arc portion 202₁ is two hundred ten degrees (210°). In the same embodiment, in the second split ring portion 50B₂, the first arc portion 200₂ is two hundred ten degrees (210°), and the second arc portion 202₂ is one hundred fifty degrees (150°).

Alternately, in the embodiment shown in FIGS. 2, 3, and 10–13, the split ring portions 50₁ and 50₂ each have a first arc portion 210₁ and 210₂, respectively, on the obverse side 112 having a first thickness $H_I$ on one side of the gasket seat 52₁ or 52₂, respectively, and a second arc portion 212₁ and 212₂ on the reverse side 114 having a second thickness of $H_L$ on a longitudinally opposite side of the gasket seat 52₁ or 52₂, respectively. As shown, first arc portion 210₁ is one hundred eighty degrees (180°) degrees, and said second arc portion 212₁ is one hundred eighty degrees (180°). However, the first arc portion 210₁ is offset from the second arc portion 212₁ by a preselected angle alpha (α). And, in matching angular fashion, first arc portion 210₂ is offset from second arc portion 212₁ by the same preselected angle alpha (α). As shown, one suitable angle alpha (α) has been found to be about thirty degrees (30°).

With the various components have been described in detail, it is easy to understand how a piping structure can be manufactured which incorporates the slip coupling 20 described herein to allow a smooth wall pipe 22 to expand or contract relative to a suitable outer casing 40. I have found that a slip coupling manufactured according to the teachings herein can be used for containment of pressurized fluids, and in particular, pressurized gases. In fact, a pressurizable fluid seal is provided which can easily be used for service up to about one hundred and fifty (150) pounds of fluid pressure, such as pressurized gas. Such a configuration can easily be used for rather long expansion, or subsidence situations, as encountered in landfill gas applications. For example, the slip coupling 20 is slidable along a preselected length L of pipe 22, which length may easily be configured for a change of at least two (2) feet. By use of the same techniques as taught herein, and normal piping supports as known by those of ordinary skill in the art, a length of change in length L of at least 10 feet can be accommodated. In some applications, and again especially for landfill situations, it is expected that a change in length of at least forty (40) or more feet can be accommodated. Thus, the slip coupling provided herein allows the easy, leak tight connection to well head piping in a landfill gas gathering situation, or in other utility line connections.

Although various aspects and elements of the invention are herein disclosed for illustrative purposes, it is to be understood that the slip coupling for pipe, and the method of use of the slip coupling in landfill gas gathering systems, are important improvements in the state of the art of devices and methods for piping joints. Although only a few exemplary aspects have been described in detail, various details are sufficiently set forth in the figures of the drawing and in the specification provided herein to enable one of ordinary skill in the art to make and use the invention(s), which need not be further described by additional writing in this detailed description. Importantly, the aspects and embodiments described and claimed herein may be modified from those shown without materially departing from the novel teachings and advantages provided as described herein, and may be embodied in other specific forms without departing from the spirit or essential characteristics thereof. It is especially pointed out that the size, and extent of movement of a pipe relative to an outer casing, or the length of a slip coupling to accommodate an anticipated degree of movement, and the precise shape of the apparatus suitable for a specific situation, will vary widely based on the nature of the physical situation and the fluids being handled. Therefore, the embodiments presented herein are to be considered in all respects as illustrative and not restrictive. As such, this disclosure is intended to cover the structures described herein and not only structural equivalents thereof, but also equivalent structures. Numerous modifications and variations are possible in light of the above teachings. For example, the various piping components, including pipe, outer casing, backing rings, split rings, or backing rings for split rings, may, for a particular service requirement, be made of may materials, including (a) high density polyethylene, (b) an aluminum alloy, (c) stainless steel, (d) brass, (e) carbon steel, (f) polyvinyl chloride, or (g) a moldable reinforced composite material. It is therefore to be understood that within the scope of the appended claims, the invention(s) may be practiced otherwise than as specifically described herein. Thus, the scope of the invention(s) is as described herein and as set forth in the appended claims, and as indicated by the drawing and by the foregoing description, is intended to include variations from the embodiments provided which are nevertheless described by the broad interpretation and range properly afforded to the plain meaning of the language of the claims set forth below.

The invention claimed is:

1. A slip coupling for engaging a pipe having a longitudinal axis, a smooth outer wall, and an end opening, said slip coupling comprising:
    (a) an outer casing, said outer casing having (1) an interior passageway, said interior passageway sized and shaped to fit therein at least some length of said pipe, and (2) a flanged end;
    (b) a split ring, said split ring comprising first and second ring portions, said first and second ring portions each having an interior wall, said interior wall further comprising at least one gasket seat, wherein said gasket seat comprises a recess in said interior wall of said first and of said second ring portions, said first and second ring portions adjustably movable between an open position wherein said first and second rings open to allow attachment to or removal from said pipe, and a closed position wherein said first and second ring portions are securable in close fitting engagement around said pipe; and (c) a gasket, said gasket located at said at least one gasket seat in said inner wall of said first and said second ring portions, said gasket adapted to slidably receive said smooth outer wall of said pipe and to provide a fluid tight seal between said split ring and said smooth outer wall of said pipe.

2. The apparatus as set forth in claim 1, further comprising an outer casing backing flange, said outer casing backing flange sized and shaped for close fitting engagement over said flanged end of said outer casing.

3. The apparatus as set forth in claim 1 or in claim 2, wherein said first and second ring portions, when in said closed position, comprise a split ring having a substantially annular ring shape which extends between an outer wall and said interior wall.

4. The apparatus as set forth in claim 3, wherein said split ring further comprises a plurality of longitudinally extending bolt through apertures defined by bolt hole interior walls.

5. The apparatus as set forth in claim 4, further comprising a plurality of fasteners having shaft portions, and wherein said backing flange comprises a plurality of fastener through apertures, wherein each fastener through aperture is defined by an aperture edge wall portion, and wherein said shaft portions of said fasteners are sized and shaped for fitting through one of said fastener through apertures in said backing flange and through a companion axially aligned bolt through aperture in said split ring, and wherein at least one of said plurality of fasteners is adjustably tightenable to secure said backing flange and said split ring each toward the other.

6. The apparatus as set forth in claim 3, wherein eight through apertures are provided in said split ring.

7. The apparatus as set forth in claim 1, wherein said recess comprises an annular groove in said interior wall of said first and of said second ring portions.

8. The apparatus as set forth in claim 7, wherein said first and said second ring portions have an obverse side and a reverse side, and wherein said annular groove is centered between said obverse side and said reverse side.

9. The apparatus as set forth in claim 8, wherein upper interior body portion extends between said obverse side of said first or of said second split ring portion and said upper groove side of said annular groove, and wherein said upper interior body portion has a thickness $H_I$ equal to height $H_A$ of said annular groove.

10. The apparatus as set forth in claim 8, wherein lower interior body portion extends between said reverse side of said first or of said second split ring portion and said lower groove side of said annular groove, and wherein said lower interior body portion has a thickness $H_L$ equal to height $H_A$ of said annular groove.

11. The apparatus as set forth in claim 7, wherein said annular groove has a height $H_A$ extending between a lower groove side and an upper groove side, and wherein said first and said second ring portions comprise an upper interior body portion above said upper groove side and a lower interior body portion below said lower groove side.

12. The apparatus as set forth in claim 1, wherein said flanged end of said outer casing extends radially outward from said outer casing to an outer end to provide an integral outer casing flange of width sufficient to provide, along a longitudinal axis, a plurality of fastener holes defined by flange interior edge wall holes.

13. The apparatus as set forth in claim 1, or in claim 12, further comprising a split ring backing flange, said split ring backing flange sized and shaped for close fitting engagement against said split ring.

14. The apparatus as set forth in claim 13, further comprising a plurality of fasteners having shaft portions, and wherein said split ring backing flange comprises a plurality of fastener through apertures, wherein each fastener through aperture is defined by an aperture edge wall portion, and wherein said shaft portions of said fasteners are sized and shaped for fitting through one of said fastener through apertures in said split ring backing flange and through a companion axially aligned bolt through aperture in said split ring, and wherein at least one of said plurality of fasteners is adjustably tightenable to secure said split ring backing flange and said split ring each toward the other.

15. The apparatus as set forth in claim 13, wherein the material for manufacture of said split ring backing flange is selected from the group consisting of (a) high density polyethylene, (b) an aluminum alloy, (c) stainless steel, (d) brass, (e) carbon steel, (f) polyvinyl chloride, or (g) a moldable reinforced composite material.

16. The apparatus as set forth in claim 1, wherein the material for manufacture of said outer casing is selected from the group consisting of (a) high density polyethylene, (b) an aluminum alloy, (c) stainless steel, (d) brass, (e) carbon steel, (f) polyvinyl chloride, or (g) a moldable reinforced composite material.

17. The apparatus as set forth in claim 1, wherein the material for manufacture of said split ring is selected from the group consisting of (a) high density polyethylene, (b) an aluminum alloy, (c) stainless steel, (d) brass, (e) carbon steel, (f) polyvinyl chloride, or (g) a moldable reinforced composite material.

18. The apparatus as set forth in claim 1, wherein the material for manufacture of said flanged end is selected from the group consisting of (a) high density polyethylene, (b) an aluminum alloy, (c) stainless steel, (d) brass, (e) carbon steel, (f) polyvinyl chloride, or (g) a moldable reinforced composite material.

19. The apparatus as set forth in claim 18, wherein said flanged end comprises eight bolt holes defined by edge wall apertures, and wherein said eight bolt holes are equally angularly spaced apart.

20. The apparatus as set forth in claim 1, wherein said first and second ring portions of said split ring are identical.

21. The apparatus as set forth in claim 20, wherein each one of said split ring portions comprises a pair of ear portions, said ear portions each having a face portion adapted for matching engagement with an identical face portion of another split ring portion.

22. A slip coupling for engaging a pipe having a longitudinal axis, a smooth outer wall, and an end opening, said slip coupling comprising:

(a) an outer casing, said outer casing having (1) an interior passageway, said interior passageway sized and shaped to fit therein at least some length of said pipe, and (2) a flanged end;

(b) a split ring, said split ring comprising first and second ring portions, said first and second ring portions each having an interior wall, said interior wall further comprising at least one gasket seat, said first and second ring portions adjustbly movable between an open position wherein said first and second rings open to allow attachment to or removal from said pipe, and a closed position wherein said first and second ring portions are securable in close fitting engagement around said pipe;

(c) a gasket, said gasket located at said at least one gasket seat in said inner wall of said first and said second ring portions, said gasket adapted to slidably receive said smooth outer wall of said pipe and to provide a fluid tight seal between said split ring and said smooth outer wall of said pipe; and (d) an annular seal, and wherein split ring comprises an obverse side potion, and wherein said flanged end comprises a flange face portion, and wherein said annular seal is sized and shaped for sealing engagement with and compression between said flanged face portion and said obverse side of said split ring.

23. A slip coupling for engaging a pipe having a longitudinal axis, a smooth outer wall, and an end opening, said slip coupling comprising:

(a) an outer casing, said outer casing having (1) an interior passageway, said interior passageway sized and shaped to fit therein at least some length of said pipe, and (2) a flanged end;

(b) a split ring, said split ring comprising first and second ring portions, said first and second ring portions each having an interior wall, said interior wall further comprising at least one gasket seat, said first and second ring portions adjustably movable between an open position wherein said first and second rings open to allow attachment to or removal from said pipe, and a closed position wherein said first and second ring portions are securable in close fitting engagement around said pipe;

(c) a gasket, said gasket located at said at least one gasket seat in said inner wall of said first and said second ring portions, said gasket adapted to slidably receive said smooth outer wall of said pipe and to provide a fluid tight seal between said split ring and said smooth outer wall of said pipe; and (d) a compression retainer, said compression retainer circumferentially confining said split ring against radially outward movement.

24. The apparatus as set forth in claim 23, wherein said compression retainer comprises an adjustably tightenable substantially circular metallic band.

25. The apparatus as set forth in claim 24, wherein said compression retainer comprises a pair of substantially semi-circular metallic band portions, said pair of substantially semi-circular metallic band portions comprising opposing attachment ear portions, said opposing attachment ear portions securable each toward the other by an adjustably tightenable fastener.

26. A slip coupling for engaging a pipe having a longitudinal axis, a smooth outer wall, and an end opening, said slip coupling comprising:

(a) an outer casing, said outer casing having (1) an interior passageway, said interior passageway sized and shaped to fit therein at least some length of said pipe, and (2) a flanged end;

(b) a split ring, said split ring comprising first and second ring portions, said first and second ring portions each having an interior wall, said interior wall further comprising at least one gasket seat, said first and second ring portions adjustably movable between an open position wherein said first and second rings open to allow attachment to or removal from said pipe, and a closed position wherein said first and second ring portions are securable in close fitting engagement around said pipe, wherein said first and second split ring portions each comprise a first arc portion having a first thickness on one side of said gasket seat, and a second arc portion having a second thickness on a longitudinally opposite side of said gasket seat, and wherein said first arc portion is less than one hundred eighty degrees (180°), and wherein said second arc portion is more than one hundred eighty degrees (180°); and (c) a gasket, said gasket located at said at least one gasket seat in said inner wall of said first and said second ring portions, said gasket adapted to slidably receive said smooth outer wall of said pipe and to provide a fluid tight seal between said split ring and said smooth outer wall of said pipe.

27. The apparatus as set forth in claim 26, wherein said first arc portion is one hundred fifty degrees (150°), and wherein said second arc portion is two hundred ten degrees (210°).

28. A slip coupling for engaging a pipe having a longitudinal axis, a smooth outer wall, and an end opening, said slip coupling comprising:

(a) an outer casing, said outer casing having (1) an interior passageway, said interior passageway sized and shaped to fit therein at least some length of said pipe, and (2) a flanged end;

(b) a split ring, said split ring comprising first and second ring portions, said first and second ring portions each having an interior wall, said interior wall further comprising at least one gasket seat, said first and second ring portions adjustably movable between an open position wherein said first and second rings open to allow attachment to or removal from said pipe, and a closed position wherein said first and second ring portions are securable in close fitting engagement around said pipe, wherein said first and second split ring portions each comprise a first arc portion having a first thickness on one side of said gasket seat, and a second arc portion having a second thickness on a longitudinally opposite side of said gasket seat, and wherein said first arc portion and said second arc portion are each one hundred and eighty degrees (180°), and wherein said second arc portion and said first arc portion are angularly offset by a preselected angle alpha ($\alpha$); and (c) a gasket, said gasket located at said at least one gasket seat in said inner wall of said first and said second ring portions, said gasket adapted to slidably receive said smooth outer wall of said pipe and to provide a fluid tight seal between said split ring and said smooth outer wall of said pipe.

29. The apparatus as set forth in claim 28, wherein said preselected angle alpha ($\alpha$) is about thirty degrees (30°).

30. An article of manufacture comprising:

(a) a pipe having a longitudinal axis, a smooth outer wall, and an end opening; and (b) a slip coupling forming a slidable, pressurizable fluid tight seal with said smooth outer wall of said pipe, said slip coupling comprising (1) an outer casing, said outer casing having (A) an interior passageway, said interior passageway sized and shaped to fit therein at least some length of said pipe, and (B) a flanged end;

(2) a split ring, said split ring comprising first and second ring portions, said first and second ring portions each having an interior wall, said interior wall further comprising at least one gasket seat, said first and second ring portions adjustably movable between an open position wherein said first and second ring portions open to allow attachment to or removal from said pipe, and a closed position wherein said first and second ring portions are securable in close fitting engagement around said pipe;
  (3) a gasket, said gasket located at said at least one gasket seat in said inner wall of said first and said second ring portions, said gasket adapted for providing a fluid tight seal between said split ring and said smooth outer wall of said pipe;
  (4) an annular seal, and wherein split ring comprises an obverse side portion, and wherein said flanged end of said outer casing comprises a flange face portion, and wherein said annular seal is sized and shaped for sealing engagement with and compression between said flange face portion and said obverse side of said split ring to provide a fluid tight seal therebetween.

31. The apparatus as set forth in claim 30, further comprising an outer casing backing flange, said outer casing backing flange sized and shaped for close fitting engagement over said flanged end of said outer casing.

32. The apparatus as set forth in claim 30, further comprising a split ring backing flange, said split ring backing flange sized and shaped for close fitting engagement against said split ring.

33. The apparatus as set forth in claim 32, wherein said split ring further comprises a plurality of longitudinally extending bolt through apertures defined by bolt hole interior walls.

34. The apparatus as set forth in claim 33, further comprising a plurality of fasteners having shaft portions, and wherein said split ring backing flange comprises a plurality of fastener through apertures, wherein each fastener through aperture is defined by an aperture edge wall portion, and wherein said shaft portions of said fasteners are sized and shaped for fitting through one of said fastener through apertures in said split ring backing flange and through a companion axially aligned bolt through aperture in said split ring, and wherein at least one of said plurality of fasteners is adjustably tightenable to secure (1) said split ring backing flange, (2) said split ring, and (3) either said outer casing backing flange or said integral outer casing flange, whichever is present, together in a leak tight assembly.

35. The apparatus as set forth in claim 34, wherein eight through apertures are provided in said split ring.

36. The apparatus as set forth in claim 31, wherein said outer casing backing flange comprises ductile iron.

37. The apparatus as set forth in claim 31, wherein said outer casing backing flange comprises eight bolt holes defined by edge wall apertures, and wherein said eight bolt holes are equally angularly spaced apart.

38. The apparatus as set forth in claim 30, wherein said flanged end of said outer casing extends radially outward from said outer casing to an outer end to provide an integral outer casing flange of width sufficient to provide, along a longitudinal axis, a plurality of fastener holes defined by flange interior edge wall holes.

39. The apparatus as set forth in claim 30 wherein said gasket seat comprises a recess in said interior wall of said first and of said second ring portions.

40. The apparatus as set forth in claim 39, wherein said recess comprises an annular groove in said interior wall of said first and of said second ring portions.

41. The apparatus as set forth in claim 30, further comprising a compression retainer, said compression retainer circumferentially confining said split ring against radially outward movement.

42. The apparatus as set forth in claim 41, wherein said compression retainer comprises an adjustably tightenable substantially circular metallic band.

43. The apparatus as set forth in claim 42, wherein said compression retainer comprises a pair of semi-circular metallic band portions, said semi-circular metallic band portions also having pairs of opposing attachment ear portions, said opposing attachment ear portions in each pair of opposing attachment ear portions secured each toward the other by an adjustably tightenable fastener.

44. The apparatus as set forth in claim 30, wherein said split ring portions are identical.

45. The apparatus as set forth in claim 44, wherein each one of said split ring portions comprises a pair of ear portions, said ear portions each having a face portion adapted for matching engagement with an identical face portion of another split ring portion.

46. The apparatus as set forth in claim 45, wherein said split ring portions each comprise a first arc portion having a first thickness on one side of said gasket seat, and a second arc portion having a second thickness on a longitudinally opposite side of said gasket seat, and wherein said first arc portion and said second arc portion are each one hundred and eighty degrees (180°), and wherein said second arc portion and said first arc portion are angularly offset by a preselected angle alpha ($\alpha$).

47. The apparatus as set forth in claim 46, wherein said preselected angle alpha ($\alpha$) is about thirty degrees (30°).

48. An assembly for collection of landfill gas, said assembly comprising:
  (a) a pipe comprising a hollow cylindrical member having smooth outer walls and an upper end;
  (b) a slip coupling assembly, said slip coupling assembly comprising
    (1) a hollow cylindrical outer casing having an interior cavity, a first open end, and a second flanged end;
    (2) an annular seal, said annular seal placed adjacent said flanged end,
    (3) a split flange, said split flange positioned adjacent said annular seal so as to compress said annular seal toward said flanged end, said split flange further comprising a gasket seat,
    (4) a gasket located in said gasket seat and circumferentially extending around said smooth outer wall of said pipe to form a fluid tight seal therebetween, and
    (5) one or more backing rings and a plurality of fasteners to secure (A) said flanged end of said outer casing, (B) said annular seal, (C) said split flange, and (D) said gasket, in a fluid tight relationship.

49. The apparatus as set forth in claim 48, wherein material of construction for said split flange is selected from the group consisting of (a) high density polyethylene, (b) an aluminum alloy, (c) stainless steel, (d) brass, (e) carbon steel, (f) polyvinyl chloride, or (g) a moldable reinforced composite material.

50. The apparatus as set forth in claim 48, wherein the material of construction for said outer casing is selected from the group consisting of (a) high density polyethylene, (b) an aluminum alloy, (c) stainless steel, (d) brass, (e)

carbon steel, (f) polyvinyl chloride, or (g) a moldable reinforced composite material.

51. The apparatus as set forth in claim 48, wherein the material of construction for said pipe is selected from the group consisting of (a) high density polyethylene, (b) an aluminum alloy, (c) stainless steel, (d) brass, (e) carbon steel, (f) polyvinyl chloride, or (g) a moldable reinforced composite material.

52. The apparatus as set forth in claim 48, wherein said slip coupling is slidable along a preselected length of said pipe, and wherein said preselected length is at least two (2) feet.

53. The apparatus as set forth in claim 48, wherein said slip coupling is slidable along a preselected length of said pipe, and wherein said preselected length is at least ten (10) feet.

54. The apparatus as set forth in claim 48, wherein said slip coupling is slidable along a preselected length of said pipe, and wherein said preselected length is forty (40) or more feet.

55. The apparatus as set forth in claim 48, wherein a fluid tight seal is provided which is capable of pressurization.

56. The apparatus as set forth in claim 48, wherein a fluid tight seal is provided capable of withstanding up to one hundred fifty (150) pounds of gas pressure.

57. The apparatus as set forth in claim 1, or in claim 30, or in claim 48, wherein said gasket comprises a resilient material having a coefficient of friction sufficiently low that said gasket remains seated during sliding movement of said gasket over said smooth outer wall of said pipe.

58. The apparatus as set forth in claim 57, wherein said gasket material comprises a fluorolastamer.

59. The apparatus as set forth in claim 58, wherein said fluorolastamer comprises hexafluoropropylne-vinylidene fluoride.

60. The apparatus as set forth in claim 59, wherein said hexafluoropropylene-vinylidene fluoride comprises a VITON.RTM. brand fluorolastamer.

61. A slip coupling for engaging a pipe having a longitudinal axis, a smooth outer wall, and an end opening, said slip coupling comprising:
(a) an outer casing, said outer casing having (1) an interior passageway, said interior passageway sized and shaped to fit therein at least some length of said pipe, and (2) a flanged end;
(b) a split ring, said split ring comprising first and second ring portions, said first and second ring portions each having an obverse side, a reverse side, and an interior wall, said interior wall further comprising at least one gasket seat, said first and second ring portions each further comprising a pair of extending ear portions, said first and second ring portions adjustably movable between an open position, wherein said first and second ring portions open to allow attachment to or removal from said pipe, and a closed position wherein said first and second ring portions are securable in close fitting engagement around said pipe, said ear portions of said first ring portion and said ear portions of said second ring portion configured for close fitting mated engagement when said split
(c) a gasket, said gasket located at said at least one gasket seat in said inner wall of said first and said second ring portions, said gasket adapted to slidably receive said smooth outer wall of said pipe and to provide a fluid tight seal between said split ring and said smooth outer wall of said pipe.

62. The apparatus as set forth in claim 61, wherein each one of the face portions comprises face portions adapted for matching engagement with an identical face portion of another split ring portion.

63. The apparatus as set forth in claim 61, wherein each said gasket seat comprises a recess in said interior wall of said first and of said second ring portions.

* * * * *